Jan. 5, 1932.    C. E. REED    1,839,589

ROLLER CUTTER ORGANIZATION FOR EARTH BORING DRILLS

Filed June 14, 1929

INVENTOR:
Clarence E. Reed,
BY
ATTORNEYS.

Patented Jan. 5, 1932

1,839,589

UNITED STATES PATENT OFFICE

CLARENCE E. REED, OF WICHITA, KANSAS, ASSIGNOR TO CHICAGO PNEUMATIC TOOL COMPANY, OF NEW YORK, N. Y., A CORPORATION OF NEW JERSEY

ROLLER CUTTER ORGANIZATION FOR EARTH BORING DRILLS

Application filed June 14, 1929. Serial No. 370,872.

The invention is designed to provide a roller cutter assembly for deep well drill bits in which the roller cutter is held in place to rotate on the spindle by means within the said roller cutter and partly seated therein and partly seated in the spindle.

In the drawings I show in Fig. 1 a central vertical section with parts in elevation of the roller cutter assembly embodying the invention.

Figure 1:
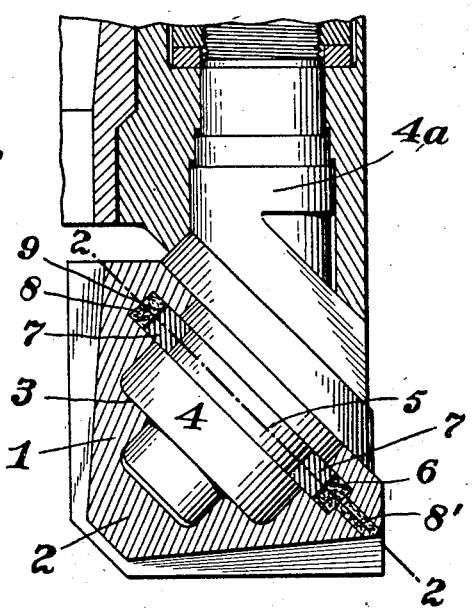
Figure 4:
Fig. 4 is a view of a strip of metal or any suitable material which is used to prevent the filling means from interfering with the closing of the segments.
Figure 2:
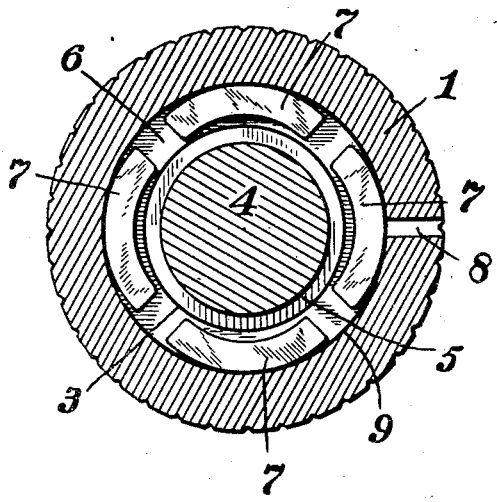
Fig. 2 is a sectional view substantially on line 2—2 of Fig. 1, but with the locking members in their initial positions, ready to be set in locking position.
Figure 3:
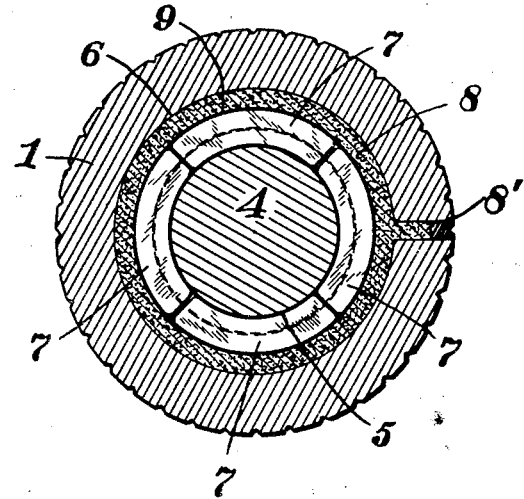
Fig. 3 is a view similar to Fig. 2 but with the lock set to hold the roller cutter against axial displacement while permitting it to have free rotary movement about the spindle.

In these drawings 1 is a roller cutter of substantially frusto-conical shape, having a closed end at 2, and a recess or bore at 3. This bore or recess receives the spindle 4, which is grooved at 5 circumferentially. The interior of the roller cutter is provided with a groove 6 matching the groove in the spindle. Segmental pieces 7 form the connection between the roller cutter and the spindle. These segments lie partly in the groove of the spindle and partly in the groove on the interior of the roller cutter. Hence the roller cutter is held against movement in the direction of the axis thereof, but it is free to turn on the spindle, and in this turning action the segments can float in the groove. For holding the segments in position to lock the roller cutter on the spindle against axial movement in relation thereto, I provide a filling material 8 of any suitable kind occupying the space between the outer edge of the segments and the bottom wall of the groove in the roller cutter.

This filling may be lead, rubber, plastic wood or fibrous material, or it may be any material capable of being inserted into said space through a comparatively small opening in the wall of the roller cutter.

In assembling the roller cutter with the spindle the segmental pieces are located in the groove in the interior wall of the roller cutter. Then by a relative movement of the spindle and cutter in an axial direction the cutter assumes its prescribed operative position in relation to the spindle, and with the groove in the roller cutter registering with that in the spindle.

Then the filling material is introduced through an opening 8' and the segments or keys are thereby displaced so as, in part, to enter the groove in the spindle. These segmental keys will now lie across the joint between the spindle and the roller cutter, and hold the roller rotatively in place.

Before placing the segments in the groove of the rotary cutter, I introduce a thin flat flexible metal strip 9 into the groove of a length to extend partly around the groove at the bottom thereof. This strip when the segments are in place surrounds say three of the segments and overlaps slightly the fourth segment. The filling material introduced into the groove acts by its pressure upon the strip and gradually forces said strip together with the segments enclosed thereby, inwardly, until the segments have crossed the joint between the roller cutter shell and the spindle, so as to lie as above mentioned, partly in the groove of the cutter and partly in the groove of the spindle, thus locking the roller cutter on the spindle against axial displacement while allowing its free rotation. The strip will accommodate itself to the closing action of the parts under the pressure of the filling material and gradually assume an arc of reduced diameter, until, when the segments are in their innermost positions with their ends abutting each other, the strip will have been contracted to a diameter substantially equal to the outer edge of the segmental ring. The ends of the strip will now be substantially together forming a closed ring surrounding the segments of the ring. This strip is so located that the filling aperture 8' will be about midway of its length.

Its main purpose is to prevent the filling material from reaching the inner side of the segmental pieces, or the joints between the segments.

The opening 8' may be plugged by any suitable means, as for instance by welding a plug therein. This opening is comparatively small and does not weaken the wall of the shell to any appreciable degree.

The roller cutter when worn may be removed from the spindle by cutting it apart for instance by a torch.

While I have shown the invention in connection with a spindle having a shank 4a it will be understood that it may be used with a spindle otherwise mounted.

It will be noted that the means which lies in the groove of the roller cutter and holds the segments in their locking positions passes from the point of insertion at 8' in a direction circumferentially about the interior groove of said cutter so as to lie between the bottom of the groove and the segments. This means may assume various forms and may consist of a flat wire of flexible material such as copper, and the opening 8' may be adapted for the insertion of such a filler.

I claim:

1. In combination in a deep well drill, a spindle having a circumferential groove, a roller cutter having a bore or recess to receive the spindle, and having an annular groove to register with the groove of the spindle when in place thereon, segmental pieces fitting in the grooves and lying across the joint between the roller cutter and the spindle, and filling means occupying the space between the outer edge of the segments and the bottom of the roller cutter groove, for holding the segments in said position across the joint, said filling means having only surface to surface engagement with the segmental pieces, and the bottom wall of the groove, substantially as described.

2. Apparatus according to claim 1 in which said filling means includes a filling material and a strip of material, said strip overlapping the segmental pieces and receiving the pressure of the filling material to hold the segments inwardly, substantially as described.

3. In combination in an earth boring drill, a spindle having a circumferential groove, a roller cutter having a bore to receive the spindle, and having an annular groove to register with the groove of the spindle, locking members lying across the joint between the spindle and the roller cutter, and located in the registering grooves, and a filling means lying between said locking members and the bottom of the groove of the roller cutter, said filling means extending circumferentially of the groove, from one locking member to another and across the joint between them, substantially as described.

4. A deep well drill according to claim 3 in which said locking members comprise segmental pieces fitting in said grooves, said roller cutter having an opening through the wall of the cutter and communicating with the said annular groove, through which opening the filling means is introduced.

5. In combination, in a deep well drill a spindle having a recess intermediate of its bearing surface, a roller cutter having a complementary recess, locking means preformed for location in the recesses to hold the roller cutter on the spindle against axial displacement while allowing free rotation, said locking means occupying only a part of said recesses and means located in part of the recess formation and having only surface to surface contact with the locking means to hold the same in position across the joint between the roller cutter and spindle substantially as described.

6. Apparatus according to claim 5 in which the roller cutter has an aperture communicating with the recess therein through which the holding means for the locking means is inserted, substantially as described.

7. Apparatus according to claim 5 in which the holding means for the locking means is initially plastic material.

In testimony whereof, I affix my signature.

CLARENCE E. REED.